United States Patent

[11] 3,595,024

[72] Inventors Gottfried Kohler
 Friedrichshafen;
 Eberhard Bader, Munich, both of,
 Germany
[21] Appl. No. 822,968
[22] Filed May 8, 1969
[45] Patented July 27, 1971
[73] Assignee Motoren-und Turbinen-Union, GmbH
 Munich, Germany
[32] Priority May 8, 1968
[33] Austria
[31] A4425/68

[54] DUCTED FAN-JET ENGINE
 5 Claims, 8 Drawing Figs.
[52] U.S. Cl. ................................................ 60/261,
 60/39.72, 60/262
[51] Int. Cl. .................................................. F02k 3/08
[50] Field of Search ........................................... 60/261,
 262, 39.72

[56] References Cited
UNITED STATES PATENTS

| | | | |
|---|---|---|---|
| 2,934,895 | 5/1960 | Gregory | 60/261 |
| 3,043,101 | 7/1962 | Lefebvre | 60/39.72 |
| 3,100,627 | 8/1963 | Wilde | 60/261 |
| 3,118,276 | 1/1964 | Keenan | 60/261 |
| 3,245,218 | 4/1966 | Marchant | 60/39.72 |
| 3,264,822 | 8/1966 | Lane | 60/39.72 |
| 3,330,117 | 7/1967 | Coplin | 60/261 |

*Primary Examiner*—Douglas Hart
*Attorney*—Craig, Antonelli, Stewart & Hill

ABSTRACT: A ducted fan-jet power plant in which a part of the bypass airflow supplied by the low-pressure compressor is conducted through hollow turbine discharge guide blades, open at their trailing edges, for the purpose of mixing the bypass flow and the main flow of the power plant within the area of the turbine discharge guide blades.

INVENTORS
GOTTFRIED KOHLER
EBERHARD BADER

BY
Craig, Antonelli, Stewart & Hill ATTORNEYS

PATENTED JUL 27 1971
3,595,024
SHEET 2 OF 2
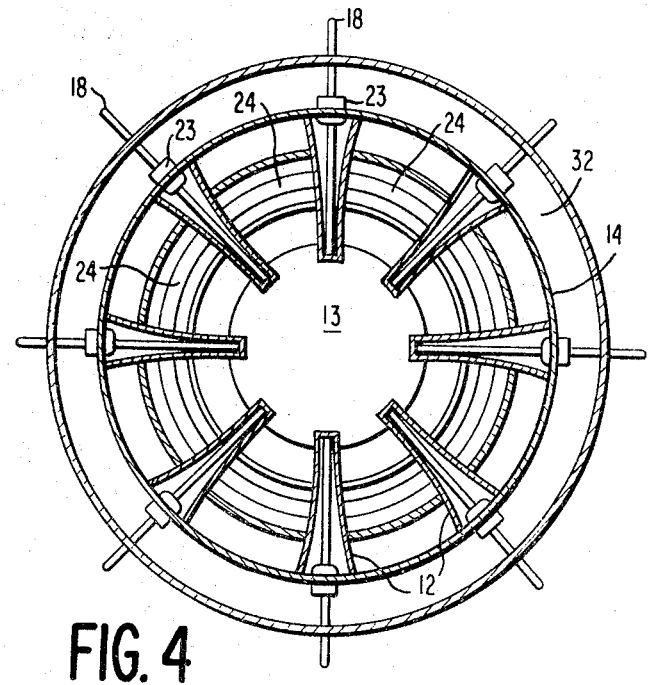
FIG. 4
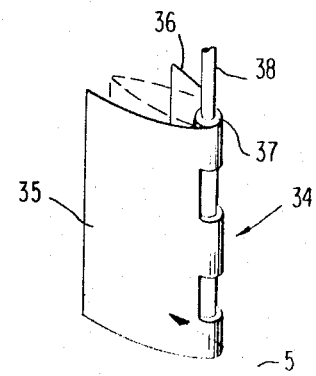
FIG. 5
FIG. 7
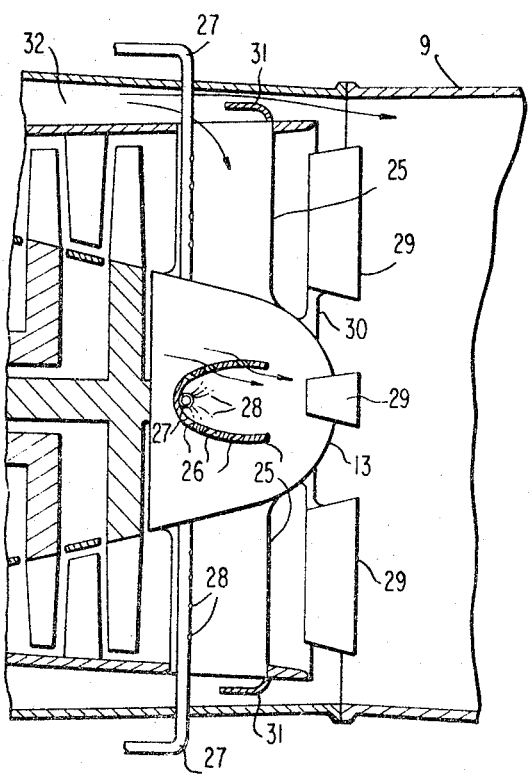
FIG. 6
FIG. 8
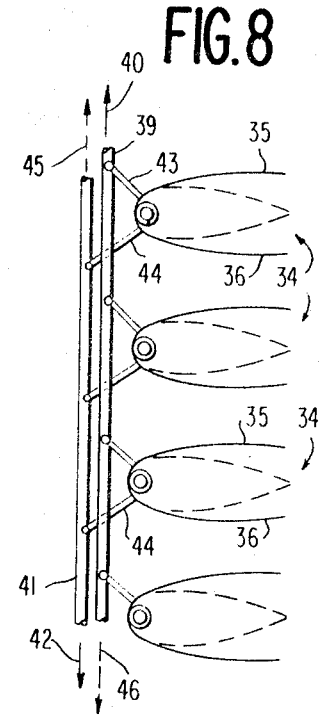

DUCTED FAN-JET ENGINE

The present invention relates to a double-flow or ducted fan-jet turbine power plant with installations for mixing the bypass flow and the core flow of the power plant upstream of the discharge of the propelling nozzle and with installations for the afterburning of the exhaust gases of the power plant.

With propulsion units of the aforementioned type, the most varied installations have become known in the prior art in order to mix with each other the bypass flow and the core flow of the propulsion unit along as short as possible a mixing path and with low pressure losses. In connection therewith, arrangements have become known which utilize pockets arranged in a star-shaped manner that project downstream of the turbine of the propulsion unit into the hot exhaust gas stream thereof. Furthermore, installations are known in the prior art in which the bypass air is blown in through longitudinal slots disposed at the circumference of the housing guiding the hot gases at a steep angle to the longitudinal axis of the hot gas stream whereby the bypass air is guided by means of stabilizing surfaces or scoops arranged at the slots and projecting into the hot gas stream in order to effect a mixing of the bypass air with the core of the hot gas stream.

In all of these known, prior art installations, the mixing plane of the bypass air and of the hot gas is is located, as viewed in the flow direction, at a larger distance downstream of the plane of the turbine discharge guide blades.

The problem of the mixing of the bypass air and of the core flow of the propulsion unit is of particular importance with the use of an afterburning of the propulsion exhaust gases downstream of the mixing zone of bypass flow and of core or main flow of the propulsion unit, and more particularly, one aims with the application of an afterburning system, to obtain as uniform as possible a temperature profile in the flame-holder plane of the afterburner.

Known, ducted fan-jet power plants of the aforementioned type equipped with afterburning systems have principally the disadvantage that the jet pipe for the afterburning adjoining the exhaust gas discharge plane of the low-pressure turbine, possesses a considerable structural length whereby again the entire propulsion unit or jet engine requires a considerable length for its installation. This results, above all, from the fact that the mixing of the bypass and of the core stream provided in the aforementioned prior art, propulsion units takes place at a considerable distance downstream of the discharge plane of the hot gases out of the low-pressure turbine.

The present invention thus aims at creating a double-flow or ducted fan-jet power plant with after burner means which possesses a lesser axial structural length compared to the known propulsion units and which further enables an optimum mixing and preparation of the propulsion gases necessary for the afterburning process.

As solution to the underlying problems, the present invention proposes with a propulsion unit of the aforementioned type, that a portion of the bypass airstream supplied by the low-pressure compressor, reaches into turbine discharge guide blades constructed hollow and open at the downstream edge, which preferably belong to the last turbine stage of the low-pressure turbine. The mixing of the bypass air flow with the core flow of the propulsion unit takes place thereby directly downstream of the discharge guide blades of the last turbine stage. The remaining portion of the bypass air stream, which is not guided through the turbine discharge guide blades, serves for the purpose of cooling the heat shield of the afterburner jet-pipe.

In order that the turbine discharge guide blades, which are always fixedly arranged in the exhaust gas stream of the propulsion unit also with a turned-off afterburning operation, do not cause any significant flow losses, the present invention additionally proposes that each turbine discharge guide blade consists of two wall parts pivotal about a common axis, whose downstream terminal edges serving for the formation of the discharge aperture are adapted to be folded one against the other whereby the discharge aperture is adapted to be closed and simultaneously a profile of the discharge guide blade is achievable, which profile is favorable from a streamline point of view.

Additionally, provision is made according to the present invention that the discharge aperture steadily becomes wider from the root to the tip end of each turbine discharge guide blade. This feature of the present invention additionally contributes to the fact that the bypass flow and the core flow of the propulsion unit are intimately mixed with each other uniformly over the flow cross section, before an afterburning takes place with supply of fuel.

In order to achieve that the bypass air is supplied along a direct path and with low flow-losses to the hot gas stream of the propulsion unit, the present invention further proposes that for the purpose of the introduction of a portion of the bypass air into the turbine discharge guide blades, means for the flow deflection and/or flow guidance are provided on the inside of the bypass air channel and/or on the inside of the turbine discharge guide blades.

A particularly appropriate arrangement for the mixing of the bypass flow and of the core-flow of the propulsion unit with devices for the afterburning results if, according to a further feature of the present invention, the turbine outlet guide blades serving for the reception of a portion of the bypass air, simultaneously serve as flame-holders of the afterburner installation.

As a result of the mixing path for the bypass flow and the core flow of the propulsion unit, which path is considerably reduced by the present invention compared to the known arrangements, it is further advantageous according to the present invention that conventional means for the fuel injection are provided on the inside of the flame holder formed by the turbine discharge guide blades, out of which fuel is adapted to be injected either in the flow direction or opposite the flow direction of the propulsion unit gases.

In an appropriate construction of the present invention, the turbine discharge or outlet guide blades are laterally provided with apertures, through which hot gases of the jet engine are adapted to be supplied to the bypass air disposed on the inside of the turbine discharge guide blades.

The turbine discharge guide blades thereby assume simultaneously the function of the mixing of bypass flow and core-flow components of the propulsion unit on the inside of the turbine discharge guide blades and the fuel-injection means possibly arranged therein thus assure an air-/gas mixture intimately mixed by vortexing or swirling with fuel. This air-/gas mixture enriched with fuel reaches, according to the present invention, a radial, short flame-holder which may be arranged directly downstream of each turbine discharge guide blade constructed as mixing means and to which the necessary mixture air is adapted to be supplied by reason of the vortexing or eddying of bypass air and core flow components of the propulsion unit in the discharge guide blades.

With the use of conventional channel-shaped flame-holders arranged coaxially to the propulsion unit longitudinal center axis, which have a cross section conically enlarged in the direction of the mainstream, the present invention is finally characterized by the arrangement of such a flame-holder in the form of circularly shaped segments between the turbine discharge guide blades whereby addition means for the fuel injection are provided upstream of the turbine discharge guide blades serving the purpose of mixing the bypass and core stream of the propulsion unit.

The flame-holders disposed as circularly shaped segments between the turbine discharge guide blades may additionally serve to establish a rigid connection of the guide blades with one another.

The present invention is applicable to double-flow or ducted fan-jet power plants or propulsion units having a low-pressure turbine shaft supported in overhung position; however, the present invention is not limited to this type of support because with appropriate design of the propulsion unit construction, the cross sections offered by the turbine discharge guide blades may be utilized also with turbines not supported in overhung position for the guidance of the auxiliary air flow.

These and further objects, features and advantages of the present invention will become more obvious from the following description when taken in connection with the accompanying drawing which shows, for purposes of illustration only, several embodiments in accordance with the present invention, and wherein:

FIG. 4 is a transverse cross-sectional view, similar to FIG. 3, and illustrating a modified embodiment of an installation forming part of a propulsion unit in accordance with the present invention;

FIG. 5 is a partial perspective view of a portion of the installation according to FIG. 4;

FIG. 6 is a partial cross-sectional view, similar to FIG. 2, of a modified embodiment of a propulsion unit in accordance with the present invention;

FIG. 7 is a perspective view on a modified embodiment of a guide blade arrangement forming part of a propulsion unit according to FIGS. 1 and 2; and FIG. 8 is a schematic view for the actuation of the installation of FIG. 7;

Figure 1:
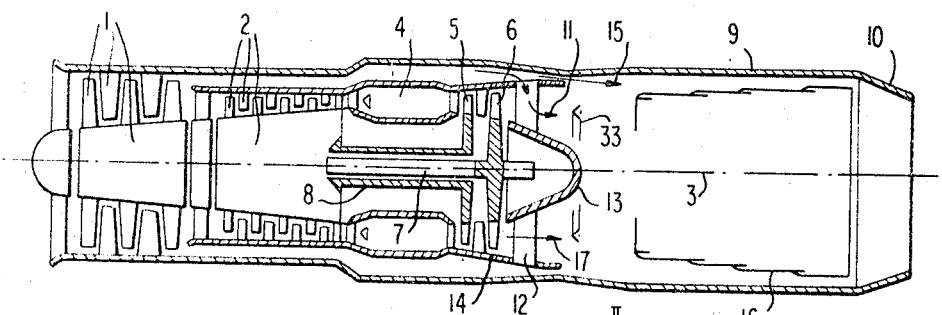
FIG. 1 is a somewhat schematic side view of ducted fan-jet power plant according to the present invention, cut along the center longitudinal axis.

Referring now to the drawing wherein like reference numerals are used throughout the various views to designate like parts, and more particularly to FIG. 1, the propulsion unit or jet-engine illustrated in this figure involves a double-flow or ducted fan-jet power plant of conventional construction, as such, which includes a conventional low-pressure compressor 1, and a conventional high-pressure compressor 2 adjoining the same, which, in turn, is adjoined by a conventional annular combustion chamber 4 arranged coaxially to the propulsion unit longitudinal center axis 3. Adjoining the annular combustion chamber 4 are then, connected in series, the conventional high-pressure turbine 5 and the conventional low-pressure turbine 6. The low-pressure turbine 6 and the low-pressure compressor 1 are arranged on the common shaft 7 while the high-pressure turbine 5 and the high-pressure compressor 2 surround the shaft 7 by means of their hollow shaft 8. Downstream of the last stage of the low-pressure turbine 6, the propulsion unit or power plan is continued in an afterburner jet-pipe 9 at the end of which is arranged an adjustable thrust or propulsion nozzle 10. As illustrated in FIG. 1, principally that portion of the bypass air supplied by the low-pressure compressor 1, which does not reach the high-pressure compressor 2, flows in the direction of the arrow 11 through the turbine discharge guide blades 12 which are supported between the exhaust gas discharge cone 13 and the housing 14 of the high- and low-pressure turbines of the propulsion unit. That portion of the bypass air flow of the low-pressure compressor 1 which has not passed thereby through the turbine discharge guide blades 12, flows in the direction of the arrow 15 into the afterburner jet pipe 9 in order to cool the associated heat shield 16 thereof. During the operation of the propulsion unit, the bypass air of the compressor 1 flowing in the direction of arrow 11 as well as the exhaust gases of the propulsion unit flowing in the direction 17 mix directly in the vertical plane, i.e., in a plane perpendicular to the axis 3 downstream of the turbine discharge guide blades 12.

Figure 2:
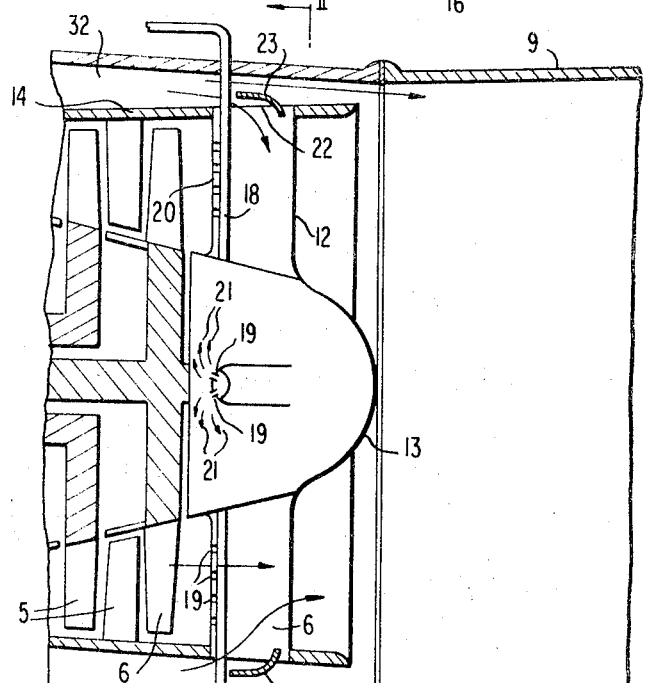
FIG. 2 is a partial cross-sectional view, on an enlarged scale, of a portion of the propulsion unit according to FIG. 1.

FIG. 2 illustrates in an enlarged cross section of a portion of the propulsion unit according to FIG. 1, the construction of the turbine discharge guide blades 12. The turbine discharge guide blades 12 are thereby simultaneously flame-holders for the afterburner system of the propulsion unit exhaust gases and are provided on the inside thereof with fuel-injection pipes 18 which are arranged on the inside of the turbine discharge guide blades and whose fuel-discharge apertures 19 are provided at the leading, rounded-off edges 20, i.e., rounded off upstream of the turbine discharge guide blades 12 so that the fuel is injected in the direction of the arrows 21 substantially opposite the flow direction of the propulsion unit exhaust gases. Within the area of the inlet apertures 22 of the turbine discharge guide blades 12 are disposed further deflection blades 23 which assure a reliable guidance, correct from a streamline point of view, of the compressor air into the turbine discharge guide blades 12.

Figure 3:
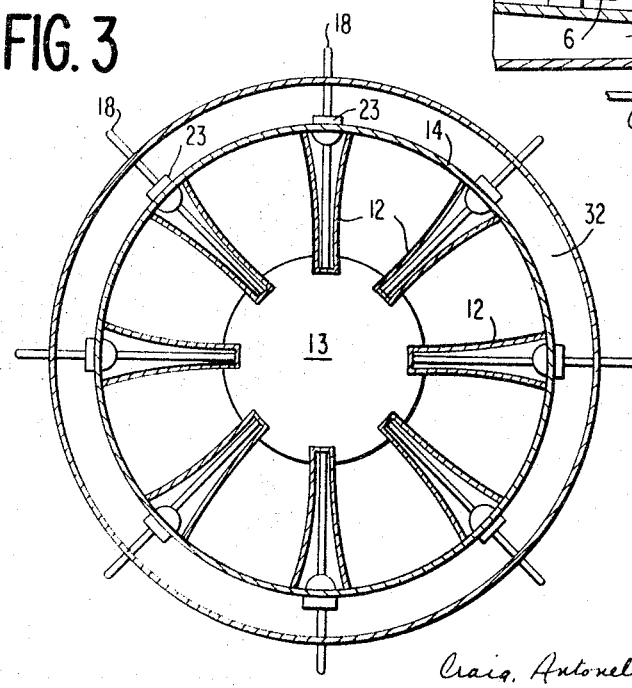
FIG. 3 is a cross-sectional view, taken along line II–II of FIG. 2.

The cross-sectional view, according to line II–II of FIG. 2, illustrates in FIG. 3 the shapes of the turbine discharge guide blades 12 which within the area of the discharge apertures are enlarged collar-shaped from the root to the tip end of each blade.

FIG. 3 illustrates eight such turbine discharge blades 12 arranged uniformly distributed over the circumference of the discharge cone 13. However, depending on the requirements, fewer or more such discharge guide blades may also be provided within the scope of the present invention.

In the embodiment illustrated in FIG. 4, in differentiation from the embodiment of FIG. 3, the individual discharge guide blades 12 are additionally connected with each other by flame-holder ring segments 24 arranged coaxially to the propulsion unit longitudinal axis 3 whereby a rigid connection of the individual turbine discharge guide blades with each other is assured. The turbine discharge guide blades 12 form simultaneously support plates between the housing 14 and the exhaust gas discharge cone 13.

FIG. 5 illustrates in perspective view a portion of the embodiment illustrated in FIG. 4.

FIG. 6 finally illustrates a further partial cross section of a propulsion unit according to FIG. 1, whereby, however, the means for the guidance of the air of the bypass flow and the means for the fuel injection and afterburner operation are modified as compared to the arrangement illustrated in FIG. 2. This modification consists primarily in that in FIG. 6, the turbine discharge guide blades 25 are provided at the lateral walls with slotted apertures 26 by way of which a portion of the propulsion unit exhaust gases reaches during operation of the propulsion unit, the turbine discharge guide blades 25 whence already on the inside of these discharge guide blades, an intimate vortexing of the bypass-airflow and core-flow components of the propulsion unit takes place. Upstream thereof are located on the inside of the turbine discharge guide blades 25, fuel-injection pipes 27 with discharge apertures 28 in order to inject fuel into the turbine discharge guide blades 25. The air-/gas mixture enriched with fuel reaches radial, short flame-holders 29 that are secured directly downstream of the discharge guide blades 25 at the exhaust gas cone 13 of the propulsion unit by means of brackets or mounting means 30. Differing from FIG. 2, there are arranged additional flow guide sheet metal plates 31 directly inside the bypass flow channel 32 and above the turbine discharge guide blades 25. The type of construction of the flame-holders 29 according to FIG. 6, however, is not limited for the application of the inventive concept. Equally well, flame-holders of conventional construction as illustrated, for example, by the flame-holder 33 in FIG. 1, may be utilized with the present invention.

By reference to FIGS. 7 and 8 the possibility is schematically represented for illustrative purposes offered by the present invention, to open the turbine discharge guide blades 34 during a propulsion unit operation when the afterburner is turned on, for the flow therethrough of bypass air components of the jet engine, with the wall parts 35 and 36 illustrated in full lines. With a turned-off afterburner of the propulsion unit, the wall parts 35 and 36 are in the position illustrated in dashline in which the trailing edges of the blades are folded against one another and the trailing discharge apertures thereof are closed whereby as a result of this measure, the turbine discharge guide blades represent closed profiles favorable from a streamline point of view.

The wall parts 35 and 36 of the turbine discharge guide blades 34 thereby enclose in the manner of a hinge-band the common bearing pin 37 (FIG. 7) which simultaneously can be constructed hollow on the inside for accommodating a fuel supply pipe 38. The flow direction of the exhaust gases of the propulsion unit is indicated in FIG. 7 by the arrow 5.

For the actuation of the opening and closing, the turbine discharge guide blades 34 are illustrated, for the sake of simplicity, as viewed from above and arranged one behind the other, i.e., unfolded into the plane of the drawing. For example, for the closing of the turbine discharge guide blades 34, a first slide member 39 is moved in the direction of arrow 40 with simultaneous movement of a second slide member 41 in the direction of arrow 42. Adjusting levers are pivotally supported at the slide member 39 as also at the slide member 41, of which one set of adjusting levers 43 is securely connected with the guide blade walls 35 and the other set of adjusting levers 34 with the blade walls 36. For the purpose of opening the turbine discharge guide blades 34, the slide members 39 and 41 are actuated in reverse sequence, i.e., in the direction indicated by the arrows 45 and 46 shown in dash lines.

While we have shown and described several embodiments in accordance with the present invention, it is understood that the same is not limited thereto but is susceptible of numerous changes and modifications as known to a person skilled in the art, and we therefore do not wish to be limited to the details shown and described herein but, intend to cover all such changes and modifications as are within the scope of those skilled in the art.

We claim:

1. A bypass gas turbine propulsion unit comprising in flow series low-pressure compressor means, high-pressure compressor means, combustion means, high-pressure turbine means, low-pressure turbine means, afterburner means including a jet-pipe with a thrust nozzle, wherein the improvement comprises hollow turbine discharge guide blade means for mixing bypass flow and core flow of the propulsion unit upstream of the nozzle, the hollow turbine discharge guide blade means at the exit of the low pressure turbine means and forming part of the afterburner means so as to effect flame stabilization, wherein fuel-injection means for injecting duel into the propulsion unit gases are located inside of the hollow turbine discharge guide blade means.

2. A propulsion unit according to claim 1, wherein the hollow turbine discharge guide blade means having leading edges provided with aperture means for directing fuel from the fuel-injection means opposite to the flow direction of the propulsion unit gases.

3. A propulsion unit according to claim 1, wherein the hollow turbine discharge guide blade means are provided laterally with aperture means through which hot gases of the propulsion unit are adapted to be supplied to the bypass air inside of the hollow turbine discharge guide blade means.

4. A propulsion unit according to claim 3, wherein the afterburner means includes radially arranged, relatively short flame-holder means downstream of the hollow turbine discharge guide blade means to which mixture air is adapted to be supplied by the vortexing of bypass airflow and core-flow components of the propulsion unit in the hollow turbine discharge guide blade means.

5. A propulsion unit according to claim 4, wherein flow guide means for the introduction of a portion of the bypass air into the hollow turbine discharge guide blade means are arranged inside bypass channel means and above the hollow turbine discharge guide blade means.